Figure 1:
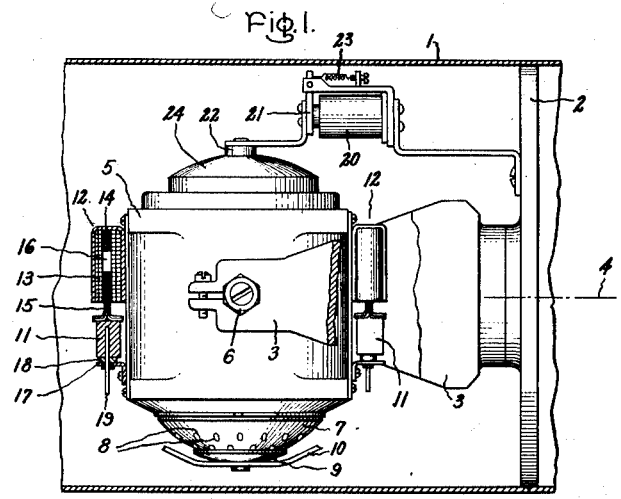

June 5, 1951  E. E. LYNCH ET AL  2,555,981
GYRO ERECTING ARRANGEMENT
Filed Dec. 22, 1949  2 Sheets-Sheet 1

Inventors:
Edward E. Lynch,
Edwin R. Gardner,
by Russell A. Warner
Their Attorney.

Patented June 5, 1951

2,555,981

UNITED STATES PATENT OFFICE 2,555,981

GYRO ERECTING ARRANGEMENT

Edward E. Lynch, Wakefield, and Edwin R. Gardner, Swampscott, Mass., assignors to General Electric Company, a corporation of New York Application December 22, 1949, Serial No. 134,468

7 Claims. (Cl. 74—5.1)

The present invention relates to gyroscope erecting arrangements and, more particularly, to arrangements wherein the pendulosity of a gyroscope is varied to accomplish rapid and accurate erection thereof.

While the inherent tendency of a gyroscopic instrument to preserve its spin axis orientation in space renders such instruments of great value in the indication of aircraft attitudes and in the provision of a stable reference for the control of other devices, it is well appreciated by those versed in the art that a gyroscope spin axis may be caused to deviate from a predetermined orientation by torques tending to rotate the axis, the application of such torques resulting in displacement of the axis at right angles to the directions of the applied torques. For example, this undesired application of torques to the gyroscope may result from the fact that the trunnions utilized in the gimbal mounting of the gyroscope are not entirely frictionless, and movements of the gimbals with reference to the gyro rotor structure may cause precessing torques to be applied to the rotor structure. Numerous systems for precessing gyroscopes to a desired orientation when departure therefrom occurs have been employed, perhaps the most commonly encountered of which are those systems which erect an aircraft type gyro vertical to the true vertical referred to the earth's surface. Since this true vertical is readily established by simple pendulous devices when accelerations are not present, such devices have been adapted to control precessing torques upon gyroscopes to produce the desired erection, but, because of the large deflections of pendulous devices from the vertical easily produced by acceleration forces other than that of gravity, it has been necessary to devise erecting schemes wherein gyroscopes are erected to the true vertical approximated by the average positions of pendulous devices and wherein momentary deflections of these devices by accelerations have little effect. Thus, it has not been possible, because of such acceleration errors, to produce a satisfactory gyro vertical instrument wherein the gyro rotor structure is itself pendulous.

In addition to those influences which act to prevent a gyro spin axis from maintaining a desired orientation during those times when the gyro rotor operates at its normal speed of rotation, there are disturbances which deflect a gyro spin axis during those intervals when the rotor is either stopped or rotating at a speed insufficient to provide ample stability. Rotor accelerations encountered during the starting interval of a gyroscope, for example, may seriously disturb the spin axis orientation, even if such orientation were correct to begin with. And it is further appreciated that movements of an earthbound aircraft may disrupt a gyro spin axis when the rotor is stationary or spinning slowly so as to produce only weak gyroscopic inertia. In accordance with this invention, however, a gyroscope spin axis may be rapidly and accurately oriented within a very short interval following energizing of the gyro motor, drifting of the spin axis following cessation of rotor motor excitation may be eliminated, and torques encountered upon acceleration or deceleration or during absence of rotor rotation may be prevented from influencing the spin axis and gimbal orientations. These advantages accrue from the arrangement wherein a gyro rotor bearing member is automatically rendered pendulous and non-pendulous at predetermined times and wherein the rotor bearing member may be fixedly positioned by a caging device which maintains the rotor bearing member in the fixed relationship with the instrument casing which exists when the caging device is actuated. Conventional caging mechanisms, by way of contrast, position the rotor axis and gimbals to assume the relationship with respect to the instrument casing which exists when the craft is in a normal flight attitude. The subject invention therefore provides that, when the aircraft supporting a horizon gyro instrument constructed in accordance therewith has landed and the rotor motor is de-energized, the gyro rotor bearing member is automatically rendered pendulous and free and aligns the gyro spin axis thereof with the true vertical. Upon re-application of rotor motor excitation, the spin axis is thus vertically oriented, even though the aircraft has been moved to a new position with a different attitude, and the rotor bearing member is held in this position by the caging device such that acceleration torques will not disturb the instrument. Thereafter, the rotor bearing member is automatically rendered non-pendulous, and, when sufficient rotor speed has been realized to preserve a desired degree of stability, the caging device releases the rotor bearing member, which is still in its fully-erected attitude, and the aircraft may become airborne with immediate and full reliance upon the gyro instrument for indicating or control purposes.

It is therefore one object of the present invention to provide a novel gyro erecting arrangement which accurately and rapidly erects a gyroscope to the true vertical.

A further object is to provide a rapid and positive gyro erecting arrangement which renders a horizon gyroscope pendulous to permit an erection to the true vertical within a short period following excitation of the instrument.

Still further it is an object to provide a horizon gyroscope erecting arrangement with "fail-safe" characteristics.

An additional object is to provide a gyro erecting arrangement which automatically and instantaneously shifts the center of gravity of a gyroscope to facilitate rapid and positive erection thereof.

Figure 2:
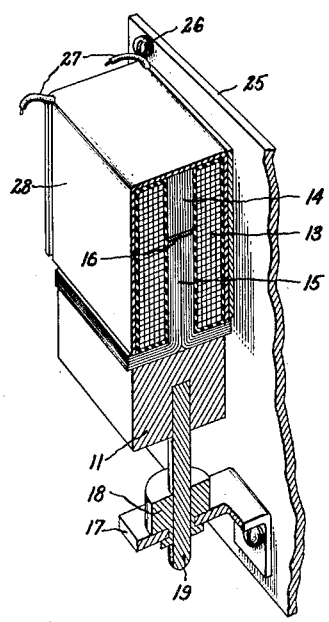
Figure 3:
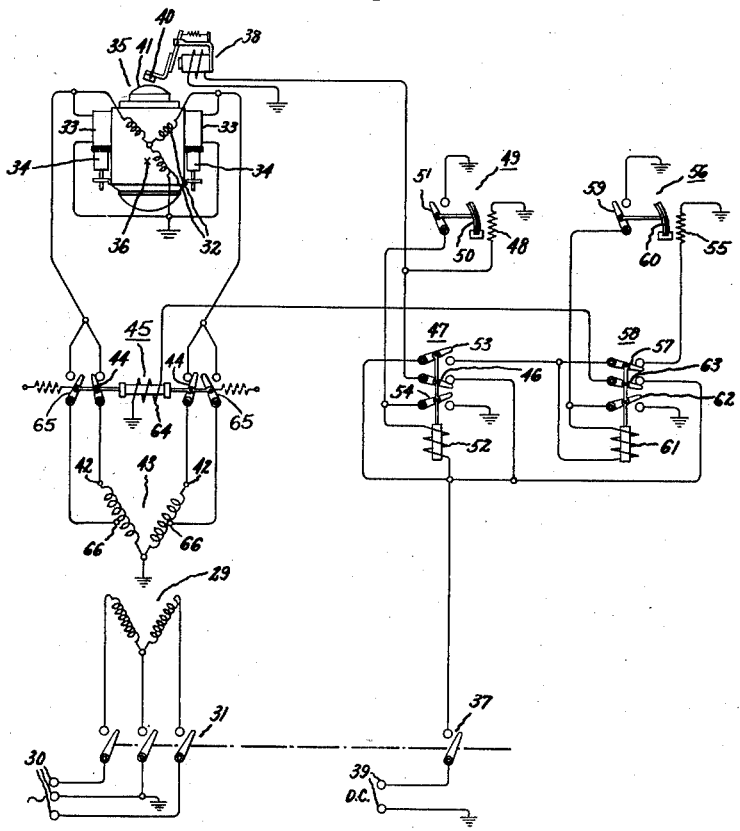

The foregoing and other objects and features of this invention are disclosed in detail in the following description wherein reference is made to the accompanying drawings of preferred embodiments thereof, in which:

Figure 1 pictorially illustrates a side view, with parts broken away, of a horizon type gyroscopic instrument incorporating solenoid-actuated members for shifting the center of gravity thereof and a caging device for holding the rotor bearing member fixed in position;

Figure 2 depicts a cut-away pictorial view of a solenoid-actuated member for rendering a gyroscope rotor bearing member pendulous; and Figure 3 represents, partially in pictorial and partially in schematic form, an erecting arrangement for accomplishing rapid and precise erection in accordance with this invention.

In Figure 1, a bank and climb type gyroscope is shown enclosed by an outer casing 1 having an internal bracket 2 upon which the main gimbal 3 is pivotally mounted with freedom to rotate about the fore and aft axis 4. Transversely to this axis, the pivot axis of the rotor bearing housing 5 lies concentric with the supporting trunnions 6. For the preservation of simplicity and clarity in the drawings the associated indicating or pick-off apparatus has not been illustrated, though it is contemplated that known arrangements might of course be utilized for direct or remote indications or automatic pilot control. A long-period pendulous erection system is provided and may incorporate an erecting magnet structure 7 having a plurality of rod-shaped magnets 8 cooperating with an erecting eddy current cup 9 affixed to a supporting yoke 10, as disclosed in the copending application of Harry C. Wendt, Serial No. 636,672, filed December 22, 1945, now Patent No. 2,486,897, for "Gyroscope Erecting Device," assigned to the same assignee as that of the present application. Symmetrically disposed, one on each side of the rotor bearing member 5, are a pair of movable weights 11 actuated by solenoids 12. These solenoid and weight elements are mounted on member 5 and are proportioned such that the weights may be moved to one level, whereupon the entire rotor bearing structure is neutrally balanced to exhibit no pendulosity about either the axis of trunnions 6 or the axis 4, and to a second level at which the rotor bearing structure is pendulous about the same axes because of the shift of the center of gravity to a position directly below the axes and in alignment with the gyro rotor spin axis.

The solenoid-actuated structures in Figure 1 are shown to comprise a solenoid coil 13, which may be energized from the same alternating current source which delivers power to the gyro rotor motor, a short laminated core 14 rigidly supported at the upper interior end of the hollow solenoid coil, a laminated solenoid plunger 15 adapted to be pulled into and to slide out of the central slot 16 in the solenoid coil, a weight member 11 attached to the lower end of the plunger 15, a bracket 17 affixed to the motor housing 5 and carrying a guide bushing and weight support 18, and a guide rod 19 attached to the weight member and slidably positioned in the guide bushing. Application of gyro motor excitation simultaneously results in instantaneous lifting of weights 11 to their uppermost positions, because of the forces which draw the solenoid plunger 15 into the coil slot 16, and the entire motor bearing structure becomes nonpendulously balanced about both the fore and aft and transverse axes. Withdrawing excitation from the gyro motor is accompanied by de-energizing of the solenoid coils, lowering of the weight members to their bottommost levels determined by the weight supports 18, and a lowering of the center of gravity of the gyro motor bearing structure to a point directly below the center of gravity produced when the non-pendulously balanced condition is experienced. The pendulosity thus achieved serves to maintain the rotor bearing structure in substantially the fully-erected position whether or not gyroscopic stability is preserved and, despite movements of the supporting aircraft, the gyro rotor spin axis remains erected to the true vertical, except when accelerations other than gravity are present, until motor excitation is re-applied.

Cooperating with this system for achieving pendulous erection is a caging device which serves to maintain the erected position during the motor starting interval. For a more complete disclosure of caging devices of this nature which may be employed in this invention, reference should be had to the copending application of Harry C. Wendt, Serial No. 105,769, filed July 20, 1949, for "Caging Device for Gyroscopes," assigned to the same assignee as that of the present application. The embodiment of that invention herein disclosed comprises a relay coil and core structure 20 mounted on backet 2, a pivoted armature 21 carrying a frictional holding member 22, and a spring element 23 separating the armature 21 from the relay core when the relay is not excited. When the relay 20 is excited the holding member 22 is in the lowered position, and in frictional engagement with the spherical cap 24 on the rotor bearing member 5. After the gyro rotor bearing member and solenoids have been de-energized, the pendulous erection of the rotor bearing structure brings the cap 24, shaped as a spherical segment, into proximity with the holding member 22. Thereafter, when motor excitation is applied, the holding relay is immediately actuated to cause firm frictional engagement between holding member and cap 24 until the gyro rotor has accelerated to a speed at which desired gyroscopic stability obtains. The complete rapid erection arrangement thus involves a cooperation between the solenoid pendulosity device, which erects prior to starting of the gyro rotor motor, and the caging device, which maintains the erected position determined by the solenoid device until the rotor reaches a predetermined speed.

One preferred solenoid-actuated pendulosity shifting device is disclosed in detail in Figure 2 which presents a cut-away enlarged perspective view thereof. A mounting bracket 25 supports the solenoid elements and in turn is affixed to the gyro rotor bearing member, as by bolts such as shown at 26. Weight 11 carries the guide rod 19 which slides through and is maintained correctly aligned by the bushing 18 which also serves as a support for the weight in its lowermost position and which is mounted upon the bracket 17 attached to bracket 25. The laminated magnetic solenoid plunger 15 is flared outwardly at its lower end and the flared portions thereof are connected, as by soldering, with the weight 11. The solenoid coil 13, energized through leads 27, is contained within a magnetic housing 26, fixed to the bracket 25, and a short length of magnetic laminations, 14, are positioned at the top of the slot 16 which accommodates the plunger 15. In this figure, the weight 11 is shown elevated and corresponds to the condition realized when the solenoid coil is excited and the solenoid plunger seeks to minimize the gap between itself and laminations 14.

Operation of the erecting arrangement of this invention may be best understood with reference to Figure 3 wherein a circuit diagram depicts the erecting system elements and their cooperative relationships. When the power supply transformer 29 is not energized from the alternating current terminals 30, due to the open position of the switch 31, the gyro motor windings 32 and the solenoid coils 33 coupled thereacross are not excited, and the solenoid weights 34 are held in their lowered position by gravity. The center of gravity of the gyro motor bearing structure 35 is thus at point 36, the structure 35 is pendulous about its supporting gimbals, and the gyro spin axis is caused to orient itself in alignment with the true vertical. Simultaneously, switch 37, being open, prevents excitation of steadying relay 38 from the direct current terminals 39, and the holding member 40 is held out of engagement with the cap 41 such that erection by pendulosity is permitted.

When the supporting aircraft is to become airborne and the gyro instrument is to be employed as a vertical reference, switches 31 and 37 are closed together and the gyro motor windings 32 and solenoid coils 33 are energized from the overvoltage taps 42 on the transformer secondary 43. Immediately, the solenoid plungers and weights 34 are raised to their upper positions at which the instrument is neutrally balanced about its support axes, and rotor rotation commences at a rapid acceleration rate due to the overvoltage delivered to the motor windings through the closed relay switches 44 of accelerating relay 45, which relay was energized through normally-closed switch 63 immediately upon the closing of switch 37. Simultaneously with the application of excitation to the motor winding, steadying relay 38 is excited through the normally closed switch 46 of relay 47 such that the holding member has instantly engaged the cap 41. Excitation of steadying relay 38 is accompanied by heating of the heater element 48 of the thermal time delay relay 49, which is illustrated as additionally comprising a bimetallic actuating element 50 and a normally-open switch 51. At the end of a predetermined time interval following the energizing of heater element 48, the bimetallic strip 50 closes switch 51, which results in excitation of relay coil 52 of relay 47 and closing of normally-open relay switches 53 and 54 and opening of the normally-closed relay switch 46. This time interval is selected to permit the gyro motor rotor to achieve a speed at which desired gyro stability obtains, for at the end of the interval the steadying relay is caused to release the rotor bearing member cap 41, because of the opening of the normally closed switch 46 of relay 47, and the gyroscope functions thereafter as a fully-erected instrument subject only to the long-period erecting action of forces exerted by conventional erecting devices. Heater element 48 of the time delay relay 49 is de-energized simultaneously with holding relay 38, and continued excitation of relay coil 52 is preserved by the closing of relay switch 54. When the normally open relay switch 53 closes at the end of this first interval, it results in energizing of heater element 55 of the second time delay relay 56 through the normally closed switch 57 of relay 58. At the end of a second predetermined interval, the normally-open switch 59 of time delay relay 56 is closed by the bimetallic actuating element 60 and relay coil 61 of relay 58 is then energized from the direct current source. When relay 58 is thus operated, the normally-closed switch 57 opens and deenergizes the time delay relay heater 55, the normally-open switch 62 closes and maintains excitation of relay coil 58 therethrough, and the normally-closed switch 63 opens and de-energizes the relay coil 64 of the accelerating relay 45. Upon the withdrawal of excitation from the accelerating relay coil 64 at the end of the second time interval, the open switches 65 close and the closed switches 44 open such that normal running voltage is applied to the motor windings 32 and solenoid coils 33 from the normal voltage taps 66 on the secondary of transformer 29. Therefore, at the end of second time interval the relays 47 and 58 are energized to maintain steadying relay 38 and time delay relays 49 and 56 out of circuit, and relay 45 is de-energized to insure that normal voltage is applied to the gyro motor and solenoids. Opening of the power source switches 31 and 37 restores the conditions originally assumed.

In many applications of the subject erecting arrangement it may be found that a shortening of the time consumed by acceleration of the gyro rotor is not essential, and in such applications it would of course be unnecessary to provide an overvoltage to the gyro motor during starting thereof. This would eliminate the need for overvoltage taps 42, relay 45, relay 58, relay switch 53 on relay 47, and time delay relay 56.

Should the solenoids 33 fail to operate, the weights 34 would maintain pendulosity of the rotor bearing member and render the instrument usable provided acceleration forces thereon were not excessive. Other "fail-safe" characteristics include: normal operation following an extended acceleration period due to failure of accelerating relay 45; reliable operation with over-voltage applied to the gyro motor and solenoids upon failure of delay relay 56 or relay 58; and normal operation following an extended erecting interval because of failure of steadying relay 38 to engage the rotor bearing member.

Although preferred embodiments of this invention have been described and illustrated herein for purposes of a lucid disclosure, it should be recognized that the invention is not limited thereto and that the scope thereof embraces numerous modifications and changes which will occur to those skilled in the art. By way of example, it is contemplated that the pendulosity-shifting arrangement may be actuated from a direct current source, with the plunger and core appropriately designed, that any convenient number of pendulous members may be employed and that these may be positioned on the rotor at any positions where the requisite effects may be realized. Additionally, means other than a solenoid and plunger may be utilized to shift the positions of weight members the suggested means comprising a relay coil and movable armature carrying a weight, or a bimetallic strip member carrying a weight at one end which is caused to move by the heating of the strip by an electrically-responsive heating element. Application of the erecting arrangement of this invention to a directional gyro instrument is also of advantage in leveling the spin axis to the horizontal. Structures for rendering the directional gyro pendulous and non-pendulous in accordance with the teachings of this invention cause the spin axis thereof to remain horizontal such that the instrument may be relied upon a short time after it is energized, and the pendulous structures may, for example, be positioned proximately with the ends of the spin axis.

While particular embodiments of the subject invention have been shown and described, these are in the nature of description rather than limitation and it will occur to those skilled in the art that various changes, modifications and combinations may be made within the province of the appended claims without departing in spirit or scope from this invention in its broader aspects.

What we claim as new and desire to secure by Letters Patent of the United States are:

1. A gyroscopic instrument comprising a gyro rotor bearing member including a rotor and electric motor means for rotating said rotor, electrical power means for energizing and de-energizing said electric motor means, gimbal means supporting said member for movement about two axes, at least one weight coupled with said rotor bearing member, said weight rendering said rotor bearing member pendulous in said gimbal means when in one position and non-pendulous when in another position, electro-responsive means for establishing said other and one positions of said weight when energized and de-energized, respectively, and means electrically coupling said electro-responsive means with said electric power means to energize and de-energize said electro-responsive means simultaneously with the energizing and de-energizing of said electric motor means.

2. A horizon gyroscope comprising a gyro rotor bearing member including a rotor and electric motor means for rotating said rotor, electric power means for energizing and de-energizing said electric motor means, gimbal means supporting said member for oscillation about two mutually perpendicular axes, a solenoid winding attached to said member, a solenoid plunger disposed to be actuated responsive to the energizing and de-energizing of said winding, a weight coupled with said plunger and movable responsive to actuation thereof, said weight being proportioned to render said member pendulous when in one position responsive to de-energizing of said winding and non-pendulous when in another position responsive to energizing of said winding, and means coupling said winding with said electric power means for energizing and de-energizing therefrom simultaneously with the energizing and de-energizing, respectively, of said electric motor means.

3. A horizon gyroscope comprising a gyro rotor bearing member including a rotor and an electric motor winding arrangement for rotating said rotor, gimbal means supporting said member for oscillation about two mutually perpendicular axes, a plurality of solenoid windings attached to said member and energized with the motor winding arrangement thereof, solenoid plungers each disposed to be actuated by one of said solenoid windings, weights each coupled with one of said plungers and movable responsive to actuation thereof, said weights being proportioned to render said member non-pendulous about said axes when in the positions determined by energizing of said solenoid windings and to render said member pendulous about both said axes when said solenoid windings are de-energized, and means for simultaneously energizing and de-energizing said motor winding arrangement and said solenoid windings.

4. In an artificial horizon instrument comprising a gyro rotor bearing member including a rotor and an electric motor winding arrangement for rotating said rotor, gimbal means supporting said member for oscillation about two mutually perpendicular axes, and an electrical power means for energizing and de-energizing said motor winding arrangement, the erecting system comprising at least one weight coupled with said rotor bearing member for actuation between a first position wherein said weight renders said member pendulous and a second position wherein said member is rendered non-pendulous about said axes, electro-responsive means for actuating said weight to said second position when energized, means for simultaneously energizing and de-energizing said motor winding arrangement and said electro-responsive means from said electrical power means, and a device for holding said rotor bearing member in the position assumed while pendulous for a predetermined time interval following energizing of said motor winding arrangement.

5. In an artificial horizon instrument comprising an instrument frame, a gyro rotor bearing member including a rotor and a motor for rotating said rotor, and gimbal means supporting said member in said frame for oscillation about two mutually perpendicular axes, the erecting system comprising at least one weight coupled with said rotor bearing member for actuation between a first position wherein said weight renders said member pendulous and a second position wherein said member is rendered non-pendulous about said axes, electro-responsive means for actuating said weight to said second position when energized, an electro-responsive holding device coupled with said frame and positioned to engage said rotor bearing member and hold said member in fixed relationship with said frame when energized, means for applying motive power to and withdrawing motive power from said motor simultaneously with the energizing and de-energizing of said weight actuating means, means for energizing said holding device simultaneously with the application of motive power to said motor and the energizing of said weight actuating means, and time delay means for de-energizing said holding device a predetermined time after energizing thereof.

6. In an artificial horizon instrument according to claim 5, the erecting system wherein said electro-responsive means comprises a solenoid winding coupled with said member, and a solenoid plunger actuated thereby and coupled with said weight, and wherein said electro-responsive holding device comprises a steadying relay having a relay coil energized from said energizing means and de-energized by said time delay means, and an armature structure movable to and from engagement with said rotor bearing member.

7. A horizon gyroscope comprising a gyro rotor bearing member including a rotor and electric motor means for rotating said rotor, gimbal means supporting said member for oscillation about two mutually perpendicular axes, pendulosity-changing means coupled with said member for selectably rendering said member pendulous and non-pendulous, means for holding said rotor bearing member fixed in position relative to said gimbal means and said axes, means for simultaneously energizing said motor means and controlling said pendulosity-changing means to render said rotor bearing member non-pendulous and for simultaneously de-energizing said motor means and controlling said pendulosity-changing means to render said rotor bearing member pendulous, and means for actuating said holding means to hold said rotor bearing member fixed in position for a predetermined time interval following energizing of said motor means.

EDWARD E. LYNCH.
EDWIN R. GARDNER.

REFERENCES CITED

The following references are of record in the file of this patent:

UNITED STATES PATENTS

| Number | Name | Date |
|---|---|---|
| 1,934,774 | Sperry, Jr., et al. | Nov. 14, 1933 |
| 2,202,955 | Langgasser | June 4, 1940 |
| 2,441,157 | Kissel | May 11, 1948 |